(12) United States Patent
Nagy

(10) Patent No.: US 10,072,936 B2
(45) Date of Patent: Sep. 11, 2018

(54) ESTIMATING A STREET TYPE USING SENSOR-BASED SURROUNDINGS DATA

(71) Applicant: Bayerische Motoren Werke Aktiengesellschaft, Munich (DE)

(72) Inventor: Istvan Nagy, Puchheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 598 days.

(21) Appl. No.: 14/681,589

(22) Filed: Apr. 8, 2015

(65) Prior Publication Data

US 2015/0211867 A1 Jul. 30, 2015

Related U.S. Application Data

(63) Continuation of application No. PCT/EP2013/070314, filed on Sep. 30, 2013.

(30) Foreign Application Priority Data

Oct. 9, 2012 (DE) .................. 10 2012 218 362

(51) Int. Cl.
*B60W 50/00* (2006.01)
*G01C 21/26* (2006.01)
(Continued)

(52) U.S. Cl.
CPC ............ *G01C 21/26* (2013.01); *B60W 50/00* (2013.01); *G06K 9/00798* (2013.01); *G06K 9/6288* (2013.01); *B60W 2550/141* (2013.01)

(58) Field of Classification Search
CPC ...... G08G 1/0104; G08G 1/167; G01C 21/26; B60W 2550/402; B60W 2520/105; G07C 5/008; G06F 17/3087
(Continued)

(56) References Cited

U.S. PATENT DOCUMENTS 6,067,501 A 5/2000 Vieweg
8,155,826 B2 * 4/2012 Nakamura ............. G01C 21/26
701/517
(Continued)

FOREIGN PATENT DOCUMENTS

DE 196 06 259 C1 6/1997
DE 101 38 641 A1 2/2003
(Continued)

OTHER PUBLICATIONS

International Search Report dated Jan. 20, 2014 with English translation (five pages).
(Continued)

*Primary Examiner* — Roy Y Yi
*Assistant Examiner* — Jeffrey Aiello
(74) *Attorney, Agent, or Firm* — Crowell & Moring LLP

(57) ABSTRACT

A method for assessing a road type is carried out by an electronic computation apparatus. The method includes the steps of: reception of environment data based on a sensor measurement; assessment of the road type using a decision tree based on the environment data; assessment of the road type using a state machine based on the environment data; and formation of an overall assessment of the road type based on the assessment using the decision tree and the assessment using the state machine.

12 Claims, 2 Drawing Sheets

(51) Int. Cl.
*G06K 9/00* (2006.01)
*G06K 9/62* (2006.01)

(58) Field of Classification Search
USPC .................. 701/1, 23, 117, 408; 702/189
See application file for complete search history.

(56) References Cited

U.S. PATENT DOCUMENTS

| | | | |
|---|---|---|---|
| 8,949,016 B1* | 2/2015 | Ferguson | B60W 30/00 340/436 |
| 2004/0240710 A1 | 12/2004 | Lages et al. | |
| 2005/0159851 A1 | 7/2005 | Engstrom et al. | |
| 2009/0002148 A1* | 1/2009 | Horvitz | G06Q 10/047 340/514 |
| 2010/0023223 A1 | 1/2010 | Huang et al. | |
| 2011/0210867 A1* | 9/2011 | Benedikt | G08G 1/01 340/905 |
| 2012/0050074 A1* | 3/2012 | Bechtel | B60R 1/04 340/988 |
| 2012/0226391 A1* | 9/2012 | Fryer | G08G 1/202 701/1 |
| 2013/0069803 A1* | 3/2013 | McCormick | G01C 21/34 340/989 |
| 2013/0085642 A1* | 4/2013 | Dankers | B60T 8/172 701/48 |
| 2013/0096815 A1* | 4/2013 | Mason | G01C 21/00 701/400 |
| 2013/0131980 A1* | 5/2013 | Ginsberg | G01C 21/30 701/446 |
| 2013/0204524 A1* | 8/2013 | Fryer | G01C 21/3407 701/527 |
| 2013/0233083 A1* | 9/2013 | Hofelsauer | G01H 1/12 73/649 |
| 2013/0245945 A1* | 9/2013 | Morita | G08G 1/096716 701/533 |
| 2013/0261838 A1* | 10/2013 | Schut | B60T 7/22 701/1 |
| 2017/0041737 A1* | 2/2017 | Fischer | H04W 4/008 |

FOREIGN PATENT DOCUMENTS

| | | |
|---|---|---|
| DE | 102 42 864 A1 | 3/2004 |
| DE | 10 2005 052 175 A1 | 5/2007 |
| DE | 10 2009 034 096 A1 | 9/2010 |
| EP | 1 557 692 B1 | 6/2009 |

OTHER PUBLICATIONS

Hayashi et al. "Road type estimation by wavelet analysis of running tire sound" Proceedings of the 2008 International Conference on Wavelet Analysis and Pattern Recognition, Aug. 30-31, 2008, pp. 650-653, Department of Systems Engineering, the University of Electro-Communications, Tokyo, Japan, XP 031329390.

Amditis et al. "A Situation-Adaptive Lane-Keeping Support System: Overview of the SAFELANE Approach", IEEE Transactions on Intelligent Transportation Systems, Sep. 1, 2010, pp. 617-629, vol. 11, No. 3, XP011312584.

German Search Report dated Mar. 1, 2013 with partial English translation (nine pages).

* cited by examiner

ESTIMATING A STREET TYPE USING SENSOR-BASED SURROUNDINGS DATA

CROSS REFERENCE TO RELATED APPLICATIONS

This application is a continuation of PCT International Application No. PCT/EP2013/070314, filed Sep. 30, 2013, which claims priority under 35 U.S.C. § 119 from German Patent Application No. 10 2012 218 362.0, filed Oct. 9, 2012, the entire disclosures of which are herein expressly incorporated by reference.

BACKGROUND AND SUMMARY OF THE INVENTION

The invention relates to a method for assessing a road type and to an apparatus that is set up for this purpose.

It is well known practice today to use a navigation system to determine the road type that a vehicle is on. To this end, a satellite-based positioning system is used to determine the position of the vehicle and a stored digital map, which also stores the type of the roads, is used to determine the road type. Examples of road types are city roads, country road and freeway.

However, identification of the road type requires the navigation system. Frequently, even in modern vehicles, such a navigation system is still not in place for reasons of cost.

DE 196 06 259 C1 discloses a method for identifying a road type without a digital roadmap being stored in the vehicle. The identification principle is based on there being a certain probability of being able to distinguish particular road types by virtue of characteristic geometric features. The method disclosed therein involves the drive profile being captured geometrically in sections and pattern recognition being used to compare said drive profile with characteristic drive profiles.

The present object for a person skilled in the art is to provide an improved method for assessing a road type and to provide a corresponding apparatus.

This and other objects are achieved by a method, an apparatus, and a motor vehicle according to the invention.

In one aspect, a method for assessing a road type, which method is carried out by an electronic computing device, comprises: reception of environment data based on a sensor measurement; assessment of the road type using a decision tree based on the environment data; assessment of the road type using a state machine based on the environment data; formation of an overall assessment of the road type based on the assessment using the decision tree and the assessment using the state machine.

The use and combination of two different assessment methods allows the accuracy of the assessment of the road type to be improved. In this context, a combination of assessment by means of a decision tree and assessment by means of a state machine has been found to be particularly advantageous. The method allows a decision tree trained using machine learning and a state machine based on human experience while assessing road type to be combined. In this preferred embodiment, the decision tree is induced using inherently known methods of machine learning, based on recorded journey data (training data), which comprise sensor-based environment data, and, as an assessment result for the road type, the road types determined by a navigation system. In other words: the training associates environment data with road types. In this embodiment, the state machine comprises transition rules between states, which represent road types and possibly the state "assessment of road type not possible", said transition rules being defined by human observation. This structure of the assessment is used to achieve particularly good assessment results. In one setup, freeways were identified with an accuracy of over 90%, for example.

Since the road type identification is not dependent on the data from a navigation system, it is not necessary for the navigation system and the stored digital maps thereof to be updated. Updating the maps can give rise to cost and administrative complexity, which can be avoided by the present invention. The runtime requirements for carrying out the method are low in comparison with the requirements for determining the road type on the basis of a navigation system with a stored digital map.

Environment data may particularly be direct measured values from sensors, or conditioned measured values, such as identified objects in a camera image or radar scan. In general, environment data describe properties of the environment of the vehicle. Suitable sensors are all of the sensors of the vehicle, for example camera systems, 3D camera systems, lateral cameras, reverse cameras, ultrasonic and lidar sensors, speedometers, yaw rate sensors or steering angle sensors. An example of environment data are conditioned data from a camera image that indicate that the lane width is 2.5 m and that the roadway is a directional roadway.

Environment data may be data from a plurality of sensors that are available as a package, for example in a vector. An environment data vector may include the lane width identified in a camera image, the number of signs identified by the camera image, oncoming traffic identified using a camera image or radar scan, identified speed limits, a streetlamp identified using a camera arranged on the side of the vehicle, obstacles identified using ultrasonic sensors or the distance from the vehicle in front, a speed bump identified using lidar sensors and/or the height of the chassis identified using capacitive sensors, for example.

The state machine can be based on human experience while assessing road type. This experience can be retained in all or some transition rules between the states.

In a state machine, the states represent the road types (for example, city road, country road and freeway) and the state that assessment of the road type is not possible or, synonymously, that it is not possible to determine the road type. The transition rules are based on Boolean expressions, which logically combine input data, that is to say environment data, with one another. An example of a transition rule is (road width >2.3 m) && (direction of roadway==Yes)→"freeway".

The overall assessment formed can be output for a particular trip section for the vehicle. In addition, provision may be made for the output of the assessment to be shaped or maintained on the basis of the particular road type. Thus, there may be provision that if the road type "city" has been assessed, this output is maintained for a trip section of 500 m for the vehicle. If the road type "country road" has been assessed, this type can be maintained for 1000 m. If the road type "freeway" has been assessed, this output can be maintained for 2000 m. When this holding section has passed, a fresh overall assessment can be output. During the holding section, provision may be made for a fresh overall assessment to be performed already, which is then output when the holding section has passed.

In one further development, the formation of an overall assessment includes the setting of the overall assessment to the assessment using the state machine when the assessment using the state machine does not output that a road type cannot be determined; the formation of an overall assessment additionally includes the setting of the overall assessment to the assessment using the decision tree when the assessment using the state machine outputs that a road type cannot be determined. This is particularly advantageous in the case of a decision tree induced by machine learning and a state machine based on human experience. While the road type can be determined using the state machine and hence using rules based on human experience, this assessment of the road type is accorded preference.

In cases in which the state machine cannot provide a statement, however, the decision tree induced by machine learning is drawn upon in order to be able to provide a statement. Assistance systems today and in the future can improve or optimize their operation on the basis of the road type and are reliant on continuous provision of this assessment. The operation of these systems is ensured thereby. Furthermore, it is possible for particular functions of an assistance system or entire assistance systems to be activated only when the vehicle is on a particular road type. At the same time, the use of the same assistance system in different vehicles is made possible, regardless of whether or not the vehicle has a navigation system and hence constant provision of the road type. This avoids matching the assistance system to vehicles with or without a navigation system, which gives rise to costs. In addition, the method utilizes sensors and resources that are typically already in place, or to the evaluations thereof, which does not require any additional components. This in turn saves costs.

The method according to the invention also allows the cable complexity, the physical volume and the programming complexity to be reduced. In addition, a vehicle configuration becomes more flexible, since driver assistance functions that require assessment or determination of the road type do not require a navigation system to be added. Both the decision tree and the state machine can be chosen such that the number of environment data that are needed for the assessment is minimized. This allows computation complexity to be decreased. The decrease in the number of environment data can likewise lead to savings for the supply of power to the sensor systems, since unneeded sensors and the electronic computing systems thereof can be disconnected. Ordinarily, these sensor systems operate independently of one another and disconnection of a sensor system reduces power consumption accordingly.

An assistance system may be an adaptive cruise control (ACC), a high beam assistant, a parking aid, a heat manager, a gearbox manager or a power manager.

In one development, the allocation of a qualification value to the overall assessment is based on whether the overall assessment is based on the assessment using the state machine or the decision tree. The qualification value is used to allow consumers of the overall assessment (for example assistance systems) to rate the reliability of the overall assessment. Thus, an overall assessment that is based on both the assessment using the state machine and the assessment using the decision tree having led to the same result can be allocated a better (possibly higher) qualification value than if the assessment using the decision tree does not confirm the assessment using the state machine. An overall assessment that is based only on assessment using the decision tree can be allocated a poorer (possibly lower) qualification value than if the overall assessment is at least also based on an assessment using the state machine.

In a further development, the method includes the reception of a set of environment data based on sensor measurements, wherein each element of the set has an assigned instant; for each element of the set: creation of a partial assessment of the road type using the decision tree based on the respective element of the set; wherein the allocation of the qualification value is also based on the number of partial assessments that match the overall assessment. This can mean, in particular, that each received element is respectively based on (at least) a sensor measurement that has been carried out at another instant. In this way, a relatively large area of the environment of the vehicle is captured and, by virtue of being split into scans, is used for partial assessment using the decision tree. The qualification value can be determined such that each partial assessment with the same result as the result of the assessment using the state machine increases the qualification value. Partial assessments with a different result, do not, however.

In another further development, the method includes the reception of a set of environment data based on sensor measurements, wherein each element of the set has an assigned instant; wherein the assessment using the decision tree comprises, for each element of the set, creation of a partial assessment of the road type using the decision tree on the basis of the respective element of the set. Assessment of the road type is based on the created partial assessment, particularly using a majority decision.

A set of environment data includes at least two separate environment data. In the case of environment data vectors, a set of environment data has at least two environment vectors. An element of the set is a single vector. Typically, each element is based on sensor data that have been measured at one instant.

The assessment using the decision tree is therefore based on a plurality of partial assessments using the decision tree, with environment data that have a different instant associated with them being used in each case. This can mean, in particular, that each received element is respectively based on (at least) a sensor measurement that has been carried out at a different instant or at a different position of the vehicle. In this way, a relatively large area of the environment of the vehicle is captured and taken into account for the assessment using the decision tree. The reliability of the assessment using the decision tree is thus increased.

In one further development, the method includes the determination of a function parameter of a sensor on the basis of the overall assessment of the road type, particularly the intensity of the power supply or the deactivation of the power supply. In this way, the operation of the sensors can be matched to the situation of the road type, which firstly can increase the performance of the sensors and at the same time, secondly, can save power. In situations in which sensor inputs are not required, the sensor can thus be put into a mode with relatively low power consumption. By way of example, the range of ultrasonic sensors is dependent on the provided level of the power supply. In cases in which obstacles at short distances need to be detected (when parking downtown, for example), the ultrasonic sensors can therefore operate with a smaller supply of current than in cases in which obstacles at greater distances need to be detected (for example, when detecting other road users on the freeway).

In another aspect, an apparatus having an electronic computing unit and a reception unit for environment data is set up to carry out one of the methods discussed above. This apparatus may be a microprocessor, a general-purpose computer or dedicated circuits. The apparatus may be set up to execute program code to carry out the method. The reception unit for environment data may be a standard interface such as USB, CAN, Ethernet, WiFi or Firewire.

Other objects, advantages and novel features of the present invention will become apparent from the following detailed description of one or more preferred embodiments when considered in conjunction with the accompanying drawings.

BRIEF DESCRIPTION OF THE DRAWINGS

The same reference symbols relate to corresponding elements throughout the figures.

DETAILED DESCRIPTION OF THE DRAWINGS

Figure 1:
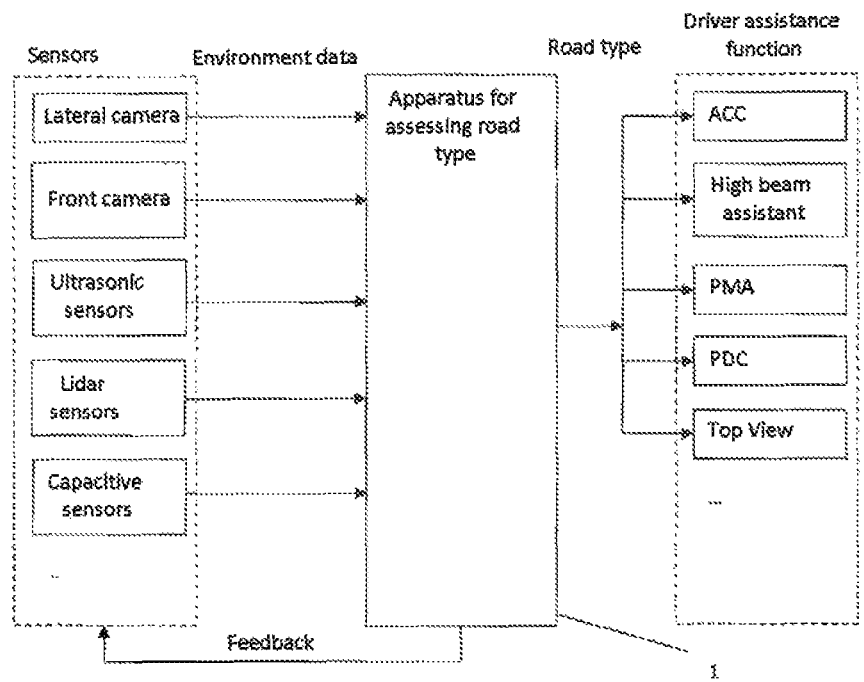
FIG. 1 is a schematic block diagram of a design of a system according to an exemplary embodiment.

FIG. 1 schematically shows the design of a system according to an exemplary embodiment. Sensors of a vehicle, such as a lateral camera, a forward-directed (front) camera, ultrasonic sensors, lidar sensors and capacitive sensors of the chassis, deliver environment data to an apparatus 1 for assessing road type. These environment data may be: streetlamps identified by the lateral camera, oncoming traffic identified by the forward-directed camera on the roadway, road signs identified by the forward-directed camera, a speed limit identified by the forward-directed camera, obstacles identified by the ultrasonic sensors on the roadway, a distance identified by the ultrasonic sensors from a vehicle in front, a speed bump identified by the lidar sensors, a height of a chassis identified by the capacitive sensors, etc. The apparatus 1 for assessing environment data takes the environment data as a basis for assessing road type, which is done using an electronic computing unit. The assessed road type is made available to different driver assistance functions. By way of example, it is made available to an automatic cruise control (ACC), a high beam assistant, a parking maneuver assistant (PMA), a park distance control (PDC) and a conditioned view of the vehicle from above, based on a plurality of cameras on the vehicle (top view). In addition, the assessed road type is made available to the sensors or sensor systems, which can be deactivated in accordance with the assessed type in order to save power.

Figure 2:
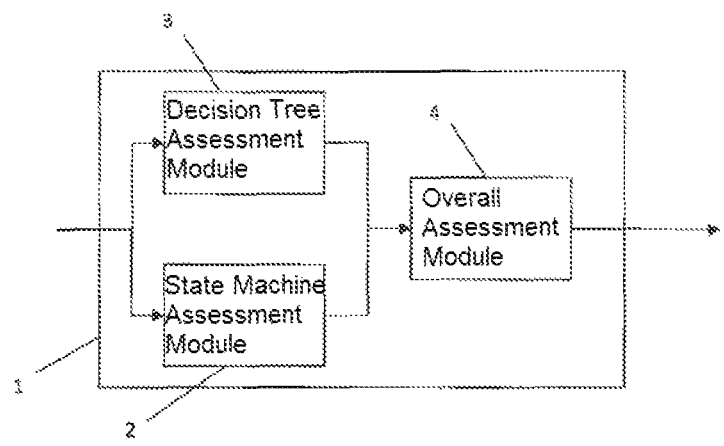
FIG. 2 is a schematic block diagram of a design of an apparatus for assessing road type according to an exemplary embodiment.

FIG. 2 schematically shows the design of the apparatus 1 for assessing road type according to an exemplary embodiment. The apparatus 1 receives environment data and forwards the environment data both to a decision tree road-type assessment module 2 and to a state machine road-type assessment module 3. Both modules 2 and 3 deliver an assessment of the road type (if need be, the module 3 delivers the output "assessment of road type not possible") to an overall road-type assessment module 4. The module 4 forms an overall (total) assessment based on the outputs from the modules 2 and 3. In this case, there is provision that while the assessment using the state machine is outputting a road type and is not outputting the output "assessment of road type not possible", this assessment of the state machine forms the overall assessment. If the assessment using the state machine results in the output that assessment of road type is not possible, the assessment using the decision tree is provided as the overall assessment. The overall assessment is output by the apparatus 1. The modules 2, 3 and 4 may be embodied either in hardware or in software. The modules 2 and 3 do not have to perform the assessment simultaneously but can also perform it in succession.

Figure 3:
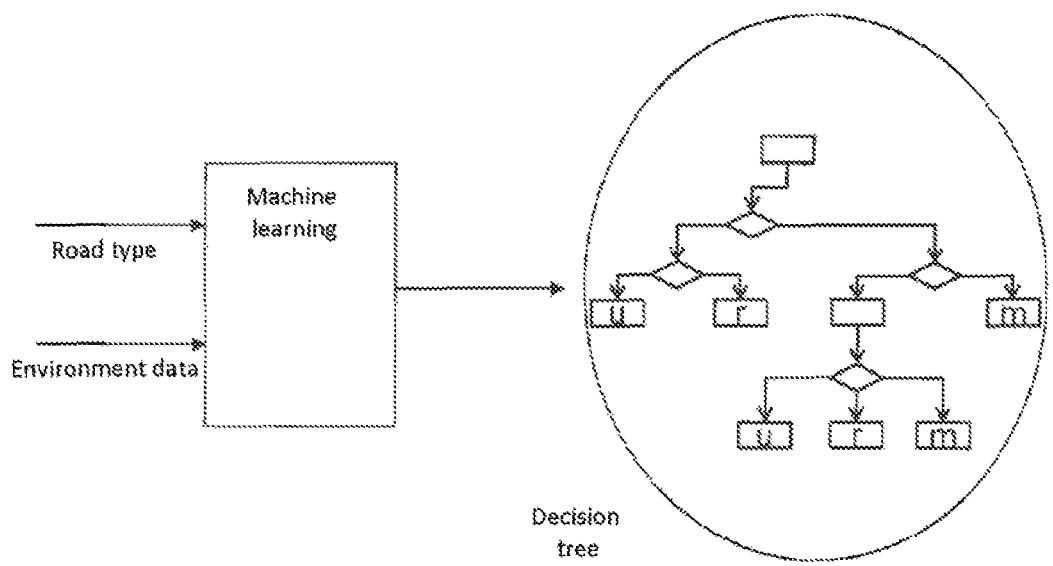
FIG. 3 is a diagram schematically showing the production of a decision tree and the decision tree according to an exemplary embodiment.

FIG. 3 schematically shows the production of a decision tree, as well as the produced decision tree. As training data, an algorithm for inducing the decision tree is provided with the vectors recorded during a trip for environment data and with the road type simultaneously determined for each vector, which road type is determined by way of a navigation system with a digital map storing the road type. Algorithms for creating or inducing the decision tree are known in the prior art. If the road types stored in the digital maps are classified more finely than the classification that the decision tree is meant to deliver, then road types stored in the map need to be combined into a road type for the decision tree. In FIG. 3, the letter "u" denotes the assessment "city" (urban), the letter "r" denotes the assessment "country road" (rural) and the letter "m" denotes the assessment "freeway" (highway). The environment data vector may include an identified speed limit, an identified lane width, an identified overtaking restriction, the number of signs on the left/right/overall, or objects identified on the left or right.

In the apparatus 1 for assessing road type, the decision tree produced is integrated into the source code of an application or of a program, for example, and is translated into machine language/object code by means of a compiler. The evaluation of a decision tree involves the input environment data (the input vector) being subjected to top-down propagation by the generated "if-then-else" construct. Each node of this tree-like setup contains a (threshold-value) query that relates to a value of the input vector or environment data vector. The leaves each contain the results from such a query path, which simultaneously correspond to one of the classes to be classified, that is to say to the assessment of the road type. The memory requirement of a decision tree as object code is firstly made up of the individual comparison commands (register load and compare operators, or branch operators, usually 32 bits each). Secondly, the threshold values with which the input data are compared take up different amounts of space according to their resolution. The first opportunity for memory space optimization is provided by the mapping of particular continuous (analog) values onto the discrete range 0-255, if the loss of accuracy is feasible for the application. In the case of very large decision trees, the definition of a customized language and the implementation of an appropriate parser provide a further opportunity for memory space reduction. In this case, a reduced and customized alphabet of operators and operands is defined that has been designed specifically for the decision tree. A querying node can therefore be reduced to a few bytes in most cases. The memory consumption of read only memory (ROM) for a decision tree was in this way able to be reduced to below 8 kB, given a general overhead of below 7 kB. The need for RAM was negligible. It is also possible to provide a separate decision tree for a particular country or a particular region. It is also possible to provide a separate decision tree for each assistance function.

Figure 4:
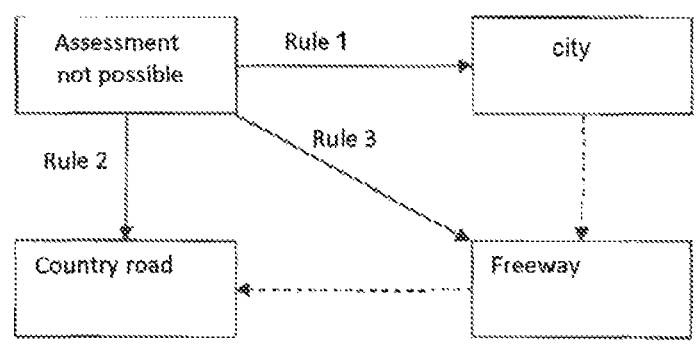
FIG. 4 is a diagram schematically showing a state machine according to an exemplary embodiment.

FIG. 4 schematically shows a state machine according to an exemplary embodiment. It shows the four states city, country road and freeway and also the state that assessment is not possible. It is possible to change over from this state to other states using three rules.

Rule 1 specifies that received environment data that indicate that a sign has been identified that indicates a calmed traffic area (play street) prompts a changeover to the "city" state. Since, in this case, the state machine delivers an assessment that differs from the state that indicates that assessment is not possible, the apparatus 1 for assessing road type outputs the assessment of the state machine "city". This assessment is output for 500 m, since the identified road type is "city".

Rule 2 specifies that received environment data that indicate that a sign has been identified that indicates a town exit prompts a changeover to the "country road" state. Since, in this case, the state machine delivers an assessment that differs from the state that indicates that assessment is not possible, the apparatus 1 for assessing road type outputs the assessment of the state machine ("country road"). This assessment is output for 1000 m, since the identified road type is "country road".

Rule 3 specifies that received environment data that indicate that the vehicle has been traveling faster than 120 km/h for 5 minutes, prompts a changeover to the "freeway" state. Since, in this case, the state machine delivers an assessment that differs from the assessment that indicates that assessment is not possible, the apparatus 1 for assessing road type outputs the assessment of the state machine ("freeway"). This assessment is output for 2000 m, since the identified road type is "freeway".

The state machine was able to be realized with a memory consumption of read only memory (ROM) of below 3 kB, given a general overhead of below 7 kB. The need for RAM was negligible. It is also possible to provide a separate state machine for a particular country or a particular region. It is also possible to provide a separate state machine for each assistance function.

The output of the apparatus 1 for assessing road type can be allocated a qualification value. This qualification value is shaped to be dependent on the assessments using the decision tree or the state machine. At the same time, the assessment using the decision tree is performed three times (or repeatedly) for this qualification value, in each case with different environment data vectors that represent sensor measurements at different times or positions of the vehicle. The plurality of assessments using the decision tree can be performed while only one assessment using the state machine is performed. The qualification value is then formed as follows, with a relatively high qualification value indicating a better overall assessment; value 5 if the assessment using the state machine is confirmed by at least two assessments using the decision tree; value 4 if the assessment using the state machine is confirmed by one assessment using the decision tree; value 3 if the assessment using the state machine is not confirmed by an assessment using the decision tree; value 2 if the state machine outputs that assessment is not possible and three assessments using the decision tree output the same assessment (which is also output as an overall assessment); value 1 if the state machine outputs that assessment is not possible and two assessments using the decision tree output the same assessment (which is also output as an overall assessment).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for assessing a road type on which a vehicle travels, the method comprising the acts of:

receiving, by an electronic computing apparatus, environment data based on a sensor measurement;

assessing, in the electronic computing apparatus, the road type using a decision tree based on the received environment data;

assessing, in the electronic computing apparatus, the road type using a state machine based on the received environment data;

forming, in the electronic computing apparatus, an overall assessment of the road type based on the assessment using the decision tree and the assessment using the state machine;

allocating, by the electronic computing apparatus, a qualification value to the overall assessment formed, the qualification value being based on whether the overall assessment is based on the assessment using the state machine or the assessment using the decision tree;

outputting, from the electronic computing apparatus, the overall assessment, including qualification value, to a driver assistance function of the vehicle; and altering an operation of the vehicle by executing a driver assistance intervention based on a determination by the driver assistance function, using the overall assessment of the road type and the qualification value, that the operation of the vehicle should be altered.

2. The method according to claim 1, wherein the assessment of the road type using the state machine also comprises an output assessment that the road type cannot be determined.

3. The method according to claim 2, wherein:

the forming of the overall assessment comprises a setting of the overall assessment to the assessment using the state machine when the assessment using the state machine does not output that the road type cannot be determined; and the formation of the overall assessment further comprises a setting of the overall assessment to the assessment using the decision tree when the assessment using the state machine outputs that the road type cannot be determined.

4. The method according to claim 1, further comprising the acts of:

receiving, by the electronic computing apparatus, a set of environment data based on sensor measurements, wherein each element of the set has an assigned instant;

for each element of the set received, creating a partial assessment of the road type using the decision tree based on the respective element of the set; and wherein the allocation of the qualification value is also additionally based on the number of partial assessments that match the overall assessment.

5. The method according to claim 1, further comprising the acts of:

receiving, by the electronic computing apparatus, a set of environment data based on sensor measurements, wherein each element of the set has an assigned instant;

wherein the assessing of the road type using the decision tree further comprises the acts of:

for each element of the set, creating a partial assessment of the road type using the decision tree based on the respective element of the set; and assessing the road type based on the partial assessments created, wherein the assessment uses a majority decision.

6. The method according to claim 1, further comprising the acts of:

receiving, by the electronic computing apparatus, a set of environment data based on sensor measurements, wherein each element of the set has an assigned instant;

wherein the assessing of the road type using the decision tree further comprises the acts of:

for each element of the set, creating a partial assessment of the road type using the decision tree based on the respective element of the set; and assessing the road type based on the partial assessments created, wherein the assessment uses a majority decision.

7. The method according to claim 1, wherein the decision tree is induced by machine learning.

8. The method according to claim 7, wherein the machine learning uses training data that, as a decision result, prescribe a determination of the road type using a satellite navigation system and a digital map.

9. The method according to claim 1, further comprising the act of:

determining a function parameter of a sensor based on the overall assessment formed of the road type.

10. The method according to claim 9, wherein the function parameter is an intensity of a power supply or a deactivation of the power supply.

11. An apparatus for assessing a road type on which a vehicle travels, comprising:

an electronic computing apparatus operatively configured to execute a program that:

receives, by an electronic computing apparatus, environment data based on a sensor measurement;

assesses, in the electronic computing apparatus, the road type using a decision tree based on the received environment data; assesses, in the electronic computing apparatus, the road type using a state machine based on the received environment data;

allocates, in the electronic computing apparatus, a qualification value to the overall assessment formed, the qualification value being based on whether the overall assessment is based on the assessment using the state machine or the assessment using the decision tree;

forms, in the electronic computing apparatus, an overall assessment of the road type based on the assessment using the decision tree and the assessment using the state machine;

outputs, from the electronic computing apparatus, the overall assessment, including qualification value, to a driver assistance function of the vehicle; and alters an operation of the vehicle by executing a driver assistance intervention based on a determination by the driver assistance function, using the overall assessment of the road type and the qualification value, that the operation of the vehicle should be altered.

12. A vehicle, comprising the apparatus according to claim 11.

* * * * *